United States Patent [19]

Machida

[11] Patent Number: 5,351,790
[45] Date of Patent: Oct. 4, 1994

[54] HYDRAULIC SUSPENSION DEVICE FOR AUTOMOBILE

[75] Inventor: Hiromi Machida, Ebina, Japan

[73] Assignee: Tokico Ltd., Kanagawa, Japan

[21] Appl. No.: 901,070

[22] Filed: Jun. 19, 1992

[30] Foreign Application Priority Data

Jun. 20, 1991 [JP] Japan .................................. 3-176131

[51] Int. Cl.⁵ .............................................. B60G 17/00
[52] U.S. Cl. ..................................... 188/314; 188/299
[58] Field of Search ............... 188/299, 314, 315, 319; 280/707

[56] References Cited

U.S. PATENT DOCUMENTS

| | | | |
|---|---|---|---|
| 3,807,717 | 4/1974 | Ito | 280/707 |
| 3,810,611 | 5/1974 | Ito et al. | 280/707 |
| 3,873,121 | 3/1975 | Ito et al. | 280/707 |
| 4,655,440 | 4/1987 | Eckert | 188/299 |
| 4,702,490 | 10/1987 | Yamaguchi et al. | 280/707 |
| 4,732,244 | 3/1988 | Verkuylen | 188/299 |
| 4,838,394 | 6/1989 | Lemme et al. | 188/299 |
| 4,921,227 | 5/1990 | Fukumura et al. | 188/314 |
| 4,973,854 | 11/1990 | Hummel | 188/314 |
| 5,016,911 | 5/1991 | Takehara et al. | 188/314 |

FOREIGN PATENT DOCUMENTS 0211042 12/1983 Japan ..................................... 188/315

Primary Examiner—Matthew C. Graham
Attorney, Agent, or Firm—Keck, Mahin & Cate

[57] ABSTRACT

A hydraulically adjustable suspension apparatus for an automobile has a proportional type of solenoid operated valve assembly for controlling the pressure or flow rate of a pressurized fluid introduced into a cylinder tube through a fluid passage. The fluid passage is formed in a piston rod so as to communicate a cylinder tube with a hydraulic control circuit. The solenoid operated valve assembly is integrally attached to either the piston rod or the cylinder tube outside of the cylinder tube.

13 Claims, 7 Drawing Sheets

HYDRAULIC SUSPENSION DEVICE FOR AUTOMOBILE

BACKGROUND OF THE INVENTION

1. Field of the Invention

The present invention relates to a suspension device for an automotive vehicle and, more particularly, to a hydraulically adjustable suspension device which is suitable for orientation or attitude control as well as leveling control of the automotive vehicle.

2. Description of Related Art

In order to maintain a nearly constant curb height or road clearance, i.e., distance from a bumper, frame, etc. to the ground, regardless of load changes on the vehicle body, various kinds of level adjustable suspension systems have been made commercially available.

For the purpose of providing a brief background that will enhance an understanding of the present invention, reference is made to FIG. 7, which is an illustration of a practical structure of a known hydraulically adjustable suspension system.

In FIG. 7, a pair of, for instance, rear hydraulic suspensions 10 includes respective hydraulic cylinders 11. Each hydraulic cylinder 11 includes a cylindrical tube 11T and a piston rod 11P which reciprocally slides in the cylindrical tube 11T. The piston rod 11P is provided with an accumulator 12 for assisting the piston rod 11P in moving up and down quickly, yet smoothly, through a damping force generating mechanism, such as a pressure reducing valve 13, which removes or reduces oscillation of hydraulic pressure circulated between the hydraulic cylinder 11 and the accumulator 12. The piston rod 11P protrudes from and is retracted into the cylindrical tube 11T. The hydraulic suspensions 10 are operated by a suspension control hydraulic (SCH) circuit, including a hydraulic oil pump 1 driven by an engine (not shown).

Hydraulic oil pump 1 draws out oil contained in an oil tank 2 through an oil intake pipe 3 and discharges and delivers pressurized oil through an oil feed pipe 4. The feed oil pipe 4 is provided with a valve and an accumulator, in that order from the oil pump 1. More particularly, in the system shown in FIG. 7, the oil feed pipe 4 is provided with a check valve 5 for preventing back flow of the discharged oil toward the oil pump 1 and an accumulator 6 for reserving the pressurized oil. The oil feed pipe 4 branches off into four branch oil feed pipes 4A (two of which are shown) for the front and rear hydraulic suspensions 10. A flow rate control means, such as a servo control valve 7, which is a proportional type of solenoid operated hydraulic servo valve, is connected to each branch oil feed pipe 4A. The servo control valve 7, which may be of any well known type, has a spool (not shown) which is operated by a solenoid (not shown) so as to occupy three operative positions. These positions are an oil feed position (A), in which the servo control valve 7 allows oil to be applied to the cylinder 10 for expansion, an oil discharge position (B), in which the servo control valve 7 allows oil to be discharged from the cylinder 10 for retraction, and a normal position (C), between the oil feed position (A) and the oil discharge position (B), in which the cylinder 10 is kept neutral. With a change in intensity of solenoid current, the servo control valve 7 causes the spool to be continuously displaced so as to vary the valve opening linearly. Generally, because of the spool, each servo control valve 7, when in the normal position (C), may allow oil leakage in the branch oil feed pipe 4A, a feed-return oil pipe 8, and a oil return pipe 9.

Feed-return oil pipe 8 is connected between the servo control valve 7 and the suspension 10. The oil return pipe 9 is connected between the servo control valve 7 and the oil tank 2. Specifically, the oil return pipes 9 are joined together so as to form a common return pipe portion 9A, through which oil is returned into the oil tank 2. In each feed-return oil pipe 8, there is provided a pilot pressure check valve 14 for preventing oil leakage from the cylinder 11 through the servo control valve 7 when it is in the normal position (C) during, for example, long periods of engine stoppage. If there is actually oil leakage, the road clearance of the vehicle will be decreased by at least the weight of the vehicle. The pilot pressure check valve 14 functions as a normal check valve so as to prevent back flow of the discharged oil from the cylinder 11 toward the oil tank 2 through the feed-return oil pipe 8 before it is subjected to high pilot pressure oil passed through a pilot pressure control valve 16, which will be described later. On the other hand, the pilot pressure check valve 14 allows a flow of oil in both directions in the feed-return oil pipe 8 while it is subjected to high pilot pressure oil passed through the pilot pressure control valve 16.

Pilot pressure control valve 16, which may be, for instance, a three port, two position electric solenoid operated directional valve, is connected to the oil feed pipe 4 at a juncture with the branch oil feed pipes 4A and the oil return pipe 9 through connecting oil pipes 17 and 18, respectively. The pilot pressure control valve 16 is connected to both of the pilot pressure check valves 14 through a connecting oil pipe 15A branching off into two pilot pressure oil pipes 15. One of the two pilot pressure oil pipes 15 is connected to each of the pilot pressure check valves 14. The pilot pressure control valve 16, thus arranged, selectively connects and disconnects the oil flow between the oil feed pipe 4 and the oil return pipe 9.

Oil feed pipe 4, upstream of the check valve 5, and the common return pipe portion 9A of the oil return pipe 9 are communicated with each other by means of an oil unload pipe 19 with a stop valve 20. The stop valve 20, which is a two port, two position electric solenoid operated valve, occupies two positions, i.e., a load position (D) and an unload position (E). The stop valve 20 is normally forced to occupy the load position (D) so as to close the unload oil pipe 19, thereby loading pressurized oil into the accumulator 6. However, when pressurized oil in the oil feed pipe 4 reaches a predetermined active pressure, which is detected by a pressure sensor, the stop valve 20 is forced to the unload position (D) and opens the oil unload pipe 19, thereby allowing pressurized oil from the oil pump 1 to circulate into the oil tank 2 through the opened oil unload pipe 19. The pilot pressure control valve 16 may be adapted to ordinarily communicate the oil return pipe 9 and the pilot pressure oil pipe 15 with each other. In such a case, the pilot pressure control valve 16 is electrically caused, simultaneously with the change in position of the servo control valve 7 to the oil discharge position (B), to communicate the oil feed pipe 4 and the pilot pressure oil pipe 15 with each other so as to open the pilot pressure check valves 14. Alternatively, the pilot pressure control valve 16 may be electrically caused, upon starting of the engine, to communicate the oil feed pipe 4 and the pilot pressure oil pipe 15 with each other so as to open the pilot pressure check valves 14.

The solenoid operated valves 7, 16 and 20 are electrically controlled by a control unit (not shown) according to vehicle conditions, such as a total vehicle loads and vehicle speeds, so as to provide the most desirable road clearance.

In a known hydraulically adjustable suspension system constructed in this way, once the oil pump 1 is actuated by the engine, the pressurized oil discharged from the oil pump 1 accumulates or is loaded in the accumulator 6 through the check valve 5. Then, when the pressurized oil is detected to have reached the predetermined active pressure, the stop valve 20 is forced to occupy the unload position (E), so as to open the oil unload pipe 19, thereby allowing pressurized oil from the oil pump 1 to circulate into the oil tank 2 through the opened oil unload pipe 19. As a result, pressurized oil in the oil feed pipe 4 is maintained at the predetermined active pressure. If a road clearance of the vehicle decreases due to increased vehicle loads, a level sensor detects the decrease in road clearance and causes the suspension control hydraulic (SCH) circuit to shift servo control valves 7 to the oil feed position (A) from the normal position (C). This allows the pressurized oil in the accumulator 6 to be fed to the hydraulic cylinders 11 of the suspensions 10 through the pilot pressure check valves 14, respectively, so as to expand the hydraulic cylinders 11 and elevate the vehicle, thereby maintaining a given road clearance of the vehicle. If, however, the road clearance of the vehicle increases due to decreased vehicle loads, the suspension control hydraulic (SCH) circuit shifts servo control valves 7 to the oil discharge position (B) from the normal position (C), allowing pressurized oil in the hydraulic cylinders 11 of the suspensions 10 to flow to the oil tank 2 through the feed-return oil pipes 8 and the oil return pipes 9 via respective pilot pressure check valves 14. As a result, the hydraulic cylinders 11 contract and lower down the vehicle, so as to maintain a given clearance between the road and the vehicle.

While maintaining a given clearance between the road and the vehicle, the piston rods 11P of the cylinders 10 may possibly undergo positional changes relative to their respective cylinder tubes 11T which are different from one another, due to inertial forces generated during steering. This may result in an inclined vehicle attitude. If in fact there are differences in suspension levels among the four suspensions 10, level sensors detect the levels of the suspensions 10 so that the respective servo control valves 7 can be properly managed so as to be selectively shifted to their oil feed positions (A) and oil discharge positions (B). The openings of the servo control valves, therefore, can be managed according to the differences for vehicle attitude control.

From a layout standpoint, the servo control valve 7 must be arranged between the cylinder 11 and the oil pump 1 and oil tank 2, and between the oil feed pipe 4 and the feed-return oil pipe 8 and the oil return pipe 9. Also, the servo control valve 7 is most practically located between the oil pump 1, which is typically located near an engine, and one of the hydraulic cylinders 11, which must be directly incorporated in a suspension 10. Consequently, there is a problem in that the known hydraulically adjustable suspension system lacks readiness and space in which the servo control valves can be assembled.

Another problem with the known hydraulically adjustable suspension system is that the hydraulic cylinder 11 is somewhat sluggish in response to shifting of the servo control valve 7. This is because when the servo control valve 7 shifts to the oil feed position (A) from the normal position (C), oil passing through the servo control valve 7 takes an excessive time to reach the hydraulic cylinder 11 because of the length of the feed-return oil pipe 8 between the servo control valve 7 and the hydraulic cylinder 11. This results in a high resistance of the feed-return oil pipe 8 to oil flow. If the hydraulic cylinder 11 is sluggish in response, particularly while the vehicle travels at a high speed, controlling attitude of the vehicle stably is difficult, even though a vehicle attitude control is performed. This adversely affects the safety of the vehicle as it travels.

SUMMARY OF THE INVENTION

It is an object of the present invention to provide a hydraulic suspension system for an automobile for vehicle level control which needs only a small space for installation of a fluid control valve means.

It is another object of the present invention to provide a hydraulic suspension system for an automobile for vehicle level control which improves the readiness with which a fluid control valve means can be assembled.

It is still another object of the present invention to provide a hydraulic suspension system for an automobile for vehicle level control in which the responsiveness of a hydraulic cylinder to fluid control is improved and which can perform quick vehicle attitude control.

These objects of the present invention are accomplished by a hydraulic suspension system for an automobile for vehicle level control which includes a hydraulic control circuit by which pressurized fluid is fed into and returned from the hydraulic suspension system and a particular hydraulic cylinder assembly which has a hollow pressure tube. A piston is slidably received in the hollow pressure tube so as to form a pressure fluid chamber within the hollow pressure tube. A piston rod is secured at one end to the piston, and its other end extends outside of the hollow pressure tube. A valve means, such as a proportional type of solenoid operated valve, is integrally attached to either the piston rod or the hollow pressure tube outside the hollow pressure tube. The valve means controls the pressure or flow rate of the pressurized fluid introduced into the pressure fluid chamber through a fluid passage incorporated in either the piston rod or the hollow pressure tube so as to communicate the pressure fluid chamber with the hydraulic control circuit.

A fluid control valve means attached to the piston rod projecting outside the hollow pressure tube or to the upper end portion of the hollow pressure tube requires only a small space for assembly. In addition, since the distance between the hollow pressure tube and the fluid control valve means is shortened considerably, fluid passage resistance between the hollow pressure tube and the fluid control valve is lowered greatly, thereby increasing the responsiveness of the hydraulic cylinder and, hence, the hydraulic suspension system.

BRIEF DESCRIPTION OF THE DRAWINGS

The above and other objects and features of the present invention will be apparent to those skilled in the art from the following description of preferred embodiments thereof when considered in conjunction with the drawings, in which the same reference numerals have been used to designate the same or similar elements throughout the drawings, and in which.

DETAILED DESCRIPTION OF THE PREFERRED EMBODIMENTS

Because automobile suspension systems are generally well known to those skilled in the art, the present description will be directed to particular elements forming parts of, or cooperating directly with, an apparatus in accordance with the present invention. It is to be understood that elements not specifically shown or described can take various forms well known to those skilled in the automobile art.

Figure 1:
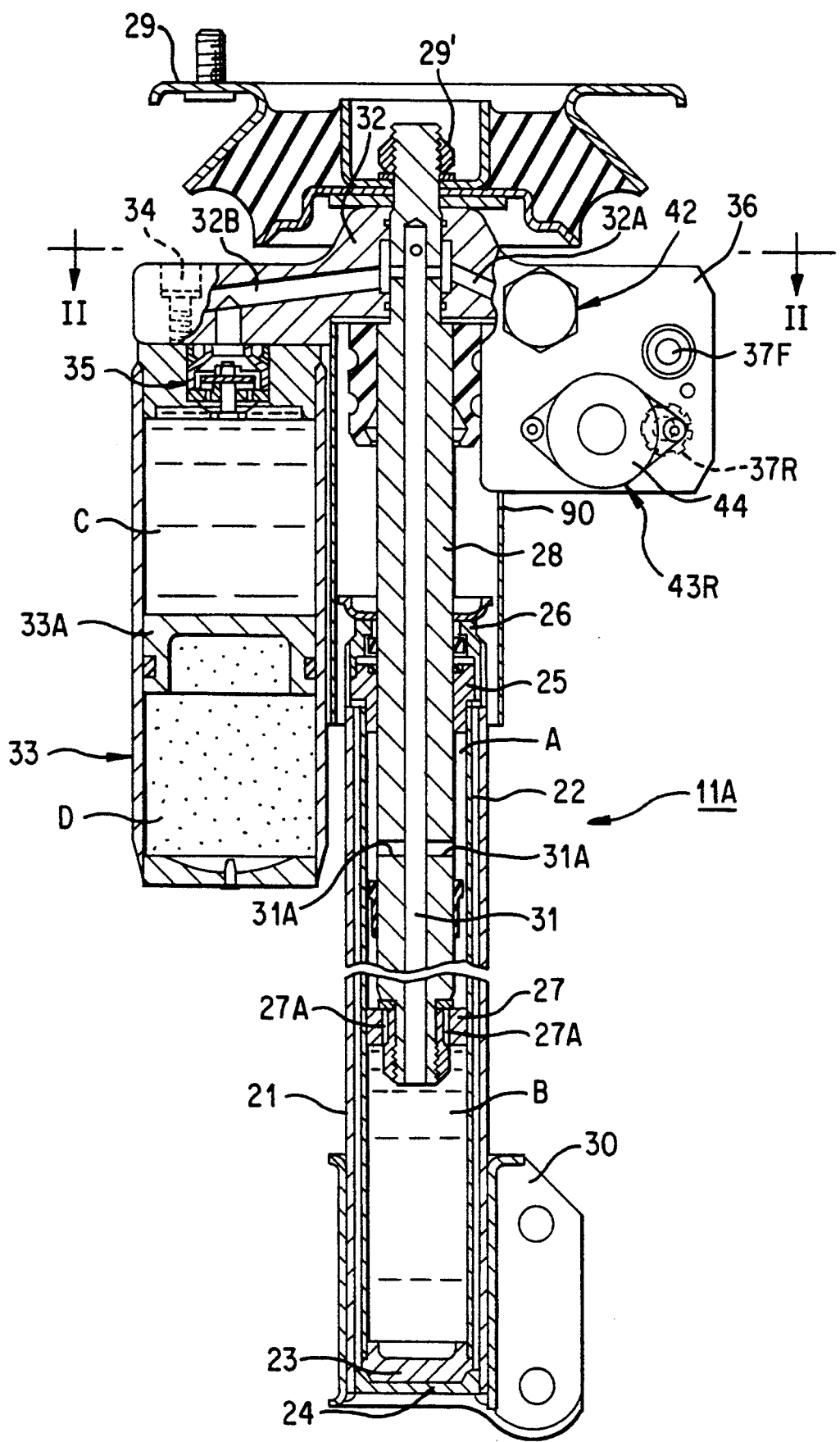
FIG. 1 is a cross-sectional view showing a hydraulic suspension system in accordance with a preferred embodiment of the present invention.
Figure 2:
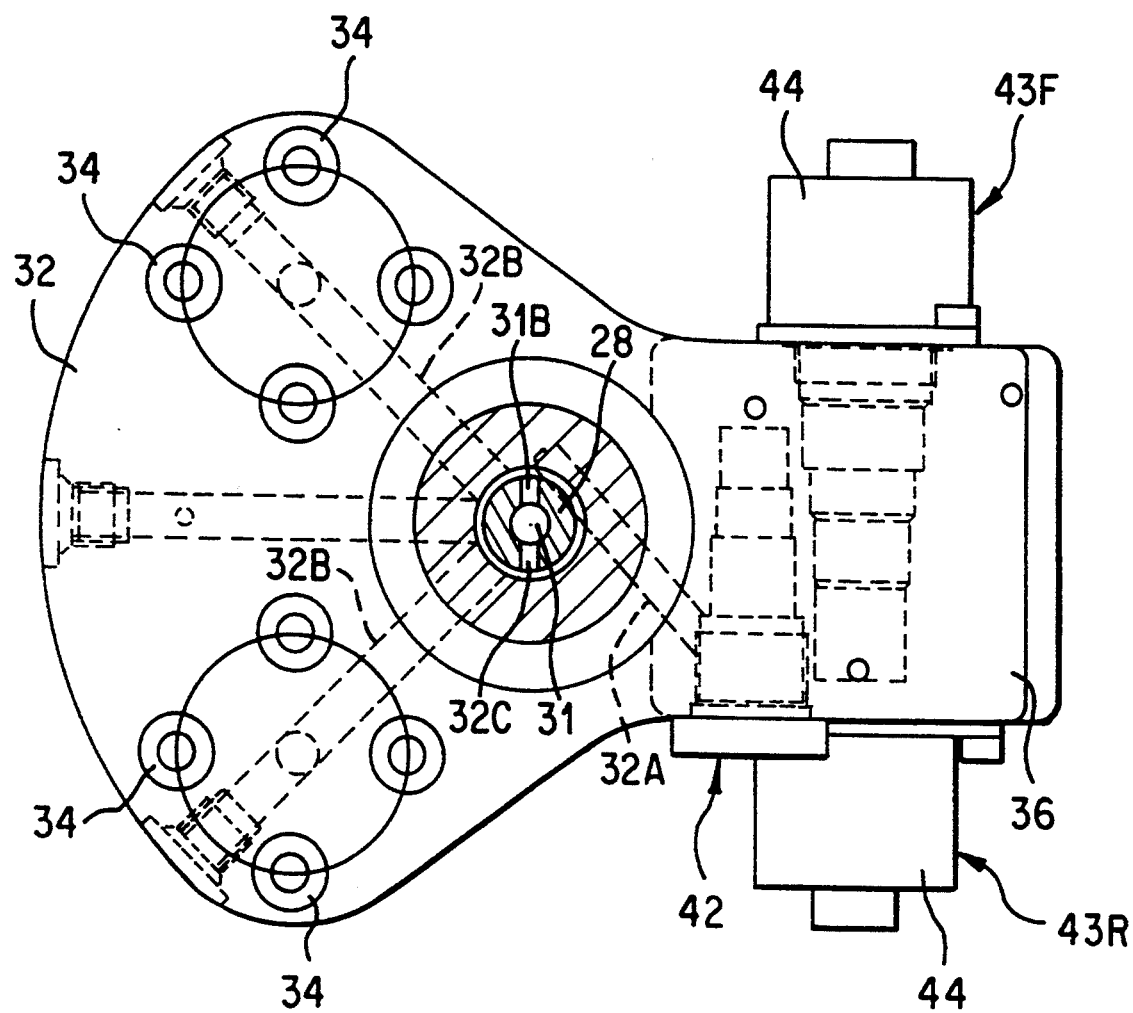
FIG. 2 is a cross-sectional view of FIG. 1 as seen along line II—II.
Figure 3:
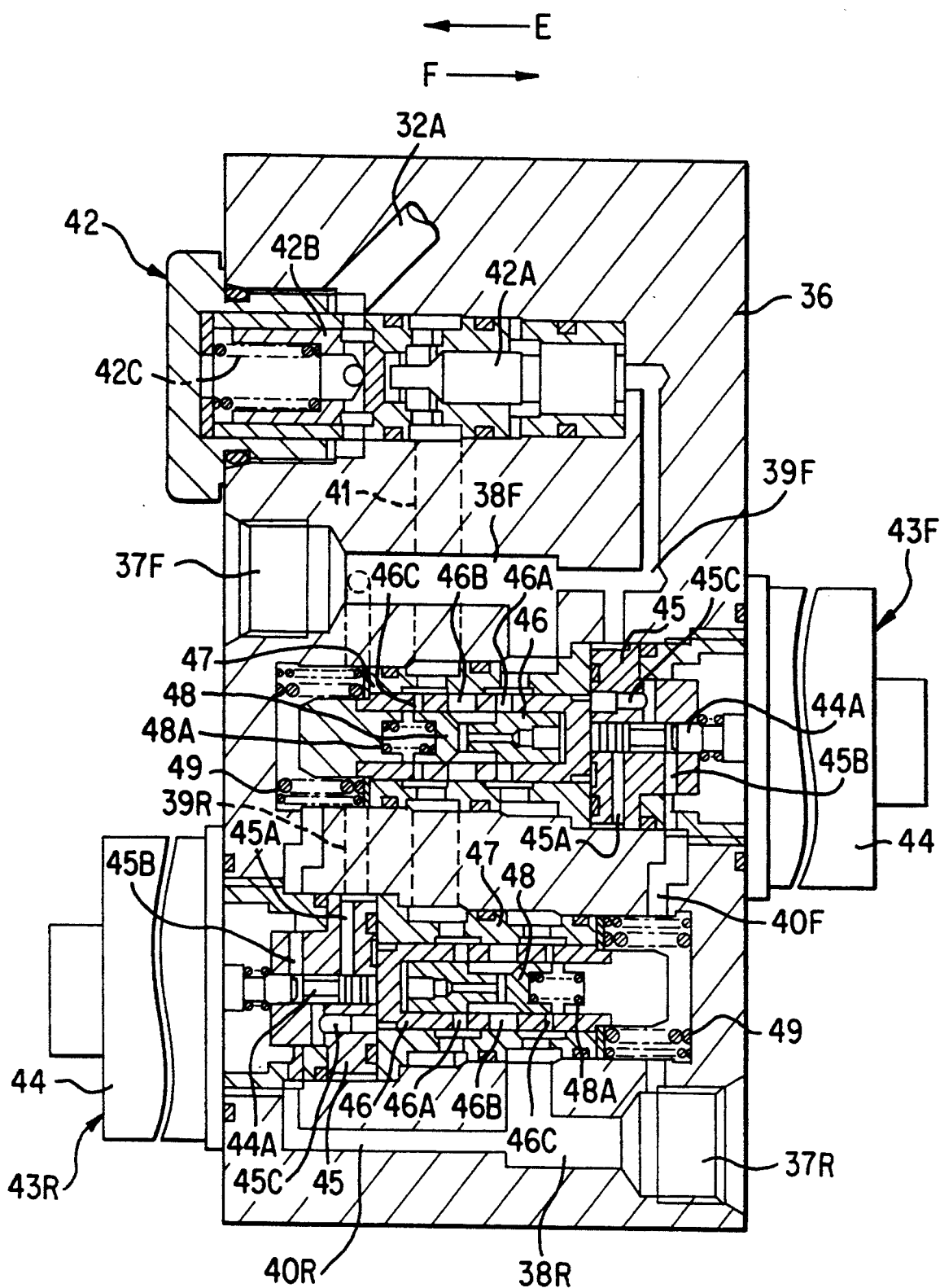
FIG. 3 is an enlarged cross-sectional view showing a valve casing of the hydraulic suspension system shown in FIG. 1.

Referring to the drawings in detail and, in particular, to FIGS. 1 to 3, a hydraulically adjustable suspension system for an automobile in accordance with a preferred embodiment of the present invention is shown, in which fluid control valves are assembled together with a hydraulic cylinder. A hydraulic cylinder 11A includes an outer cylindrical tube 21 and an inner cylindrical tube or pressure tube 22. The outer and inner tubes are disposed coaxially with each other with an air space therebetween. These tubes 21 and 22 are closed at their bottoms by means of bottom caps 23 and 24, respectively. The pressure tube 22 is provided with an annular piston rod guide 25, which is fluid-tightly fitted in both of the top openings of the outer tube 21 and the pressure tube 22. An annular top plug 26 is fastened into the top opening of the outer tube 21. The annular piston rod guide 25 and the annular top plug 26 hold a piston rod 28 so as to allow it to fluid-tightly slide up and down in the pressure tube 22. The piston rod 28 is provided with a piston 27 fastened to its lower end. The piston 27 is fluid-tightly and snugly received in the pressure tube 22 and divides the interior space into two, namely, upper and lower, oil pressure chambers A and B. The piston 27 is formed with thin bleeder bores 27A so as to communicate the oil pressure chambers A and B with each other. The outer tube 21 is provided with a mounting bracket 30 through which the cylinder 11A is fastened to a drive axle (not shown) of the vehicle in a well known manner.

Piston rod 28 is securely provided with a mount bracket assembly 29 near its top end, which is outside a cylindrical dust shield 90 and through which the piston rod 28 is fastened to a vehicle body (not shown) in a well known manner. The piston rod 28 is formed with a hollow center or axial oil passage 31 which has a lower end opening into the lower oil pressure chamber B and an upper end which is closed. Near the closed end of the axial oil passage 31, the piston rod 28 is formed with a diametrical bleeder bore 31B. The piston rod 28 is further formed approximately halfway along its length with a diametrical bleeder bore 31A opening at its opposite ends into the upper oil pressure chamber A.

Generally sector-shaped manifold 32, which is disposed between the mount bracket assembly 29 and the dust shield 90 so as to be mounted on the piston rod 28, is integrally formed with a valve casing 36 which will be described in detail later. The manifold 32 is formed with connecting oil passages 32A and 32B which extend radially from the interface with the piston rod 28 and communicate with the bleeder bore 31B of the piston rod 28 through an inner circumferential groove 32C. The connecting oil passage 32A is in communication with the interior of the valve casing 36; a pair of the connecting oil passages 32B is arranged at a certain angular spacing around the piston rod 28 and in communication with cylindrical accumulators 33 (only one of which appears in FIG. 1), respectively. Each cylindrical accumulator 33 extends downward from the manifold 32 and is secured to the side of the manifold 32 with bolts 34. The accumulator 33 snugly receives therein a piston 33A so as to divide its interior chamber into two, namely, an upper oil reservoir chamber C and a lower air chamber D. The piston 33A is movable up and down according to air pressure in the lower gas chamber D, and functions as a pneumatic spring. The accumulator 33 is provided, at its top end, with a damping force generating mechanism, such as a pressure reducing valve 35, through which the upper oil reservoir chamber C of the accumulator 33 communicates with the axial oil passage 31 of the piston rod 28 via the connecting oil passage 32A, 32B. The pressure reducing valve 35 throttles oil pressure in the accumulator 33 introduced into the upper and lower oil pressure chambers A and B through the axial oil passage 31 according to up and down movements of the piston rod 28 so as to reduce oil pressure.

As shown in FIG. 3 in detail, the valve casing 36 has an oil inlet port 37F, through which the valve casing 36 communicates with an oil pump 1 via an oil feed pipe 4, and an oil outlet port 37R, through which the valve casing 36 communicates with an oil tank 2 via an oil return pipe 9. The valve casing 36 is formed with an oil feed passage 38F and an oil return passage 38R, through which the oil inlet port 37F and the oil outlet port 37R are communicated with a flow rate control means, such as an oil feed valve 43F and an oil return valve 43R, respectively. The valve casing 36 is further formed with pilot oil passages 39F and 39R, both of which branch off from the communication passage 38F, oil return passages 40F and 40R, both of which branch off from the communication passage 38R, and a feed-return oil passage 41. The feed-return oil passage 41 is selectively communicated with the oil feed passage 38F and the oil return passage 38R through the oil feed valve 43F and the oil return valve 43R, respectively.

Valve casing 36 has three valves, namely, a pilot pressure check valve 42, an oil feed valve 43F and an oil return valve 43R. The pilot pressure check valve 42, which is disposed between the feed-return oil passage 41 and the oil passage 32A, is formed by a piston 42A, movable in opposite directions E and F, and a valve 42B. The piston 42A forces the valve 42B to move in the direction E under pilot pressure so as to permit an oil flow between the feed-return oil passage 41 and the connecting oil passage 32A. However, the valve 42B is urged by a return spring 42C so as to prevent oil leakage from the connecting oil passage 32A into the feed-return oil passage 41.

Because the oil feed valve 43F and the oil return valve 43R have the same elements, which are designated by the same reference numerals in FIG. 3, the following description will be directed to the oil feed valve 43F only.

The oil feed valve 43F and the oil return valve 43R have respective proportional type solenoids 44. The solenoids 44 are disposed at a certain vertical distance in the valve casing 36 and oriented in opposite horizontal directions. Each solenoid 44 forces a secondary spool 44A back and forth according to current applied thereto so as to control the rate of oil fed in and drawn from the oil chambers A, B and C, as will be described in detail later. A guide ring 45 is installed in the valve casing 36 so as to guide sliding movement of the secondary spool 44A. The guide ring 45 is formed with a high pressure pilot oil inlet passage 45A kept in communication with the pilot oil passage 39F, a low pressure return oil passage 45B kept in communication with the return oil passage 40F, and a pilot pressure oil outlet passage 45C selectively communicated with the pilot oil inlet passage 45A and the return oil passage 45B for pilot pressure application to and removal from a primary spool 46.

Primary spool 46, shaped in a form of a closed end cylindrical tube, is disposed between the feed oil passage 38F and the feed-return oil passage 41 and supported for sliding movement by a guide ring 47 in the valve casing 36. The primary spool 46 is formed with diametrical bleeder bores 46A, 46B and 46C, separated in the lengthwise direction, and is urged by a return spring toward the secondary spool 44A. In the interior of the primary spool 46, there are provided a pressure balancing valve 48, received for sliding movement in the primary spool 46, and a balancing spring 48A, urging the pressure balancing valve 48 to communicate the diametrical bleeder bores 46A and 46B. The balancing spring 48A is designed and adapted to maintain a predetermined difference between the pressure acting on the pressure balancing valve 48 in opposite directions. The primary spool 46 is urged by a return spring 49 so as to abut the secondary spool 44A. When pilot oil pressure is introduced through the pilot pressure oil outlet passage 45C of the guide ring 45, it forces the primary spool 46 against the return spring 49 to place the diametrical bleeder bores 46A and 46B so that the communication passage 38F and the feed-return oil passage 41 communicate with each other via the pressure balancing valve 48. On the other hand, when the pilot oil pressure is removed, the return spring 49 then forces the primary spool toward the secondary spool 44A to shut off the communication between the communication passage 38F and the feed-return oil passage 41.

Figure 7:
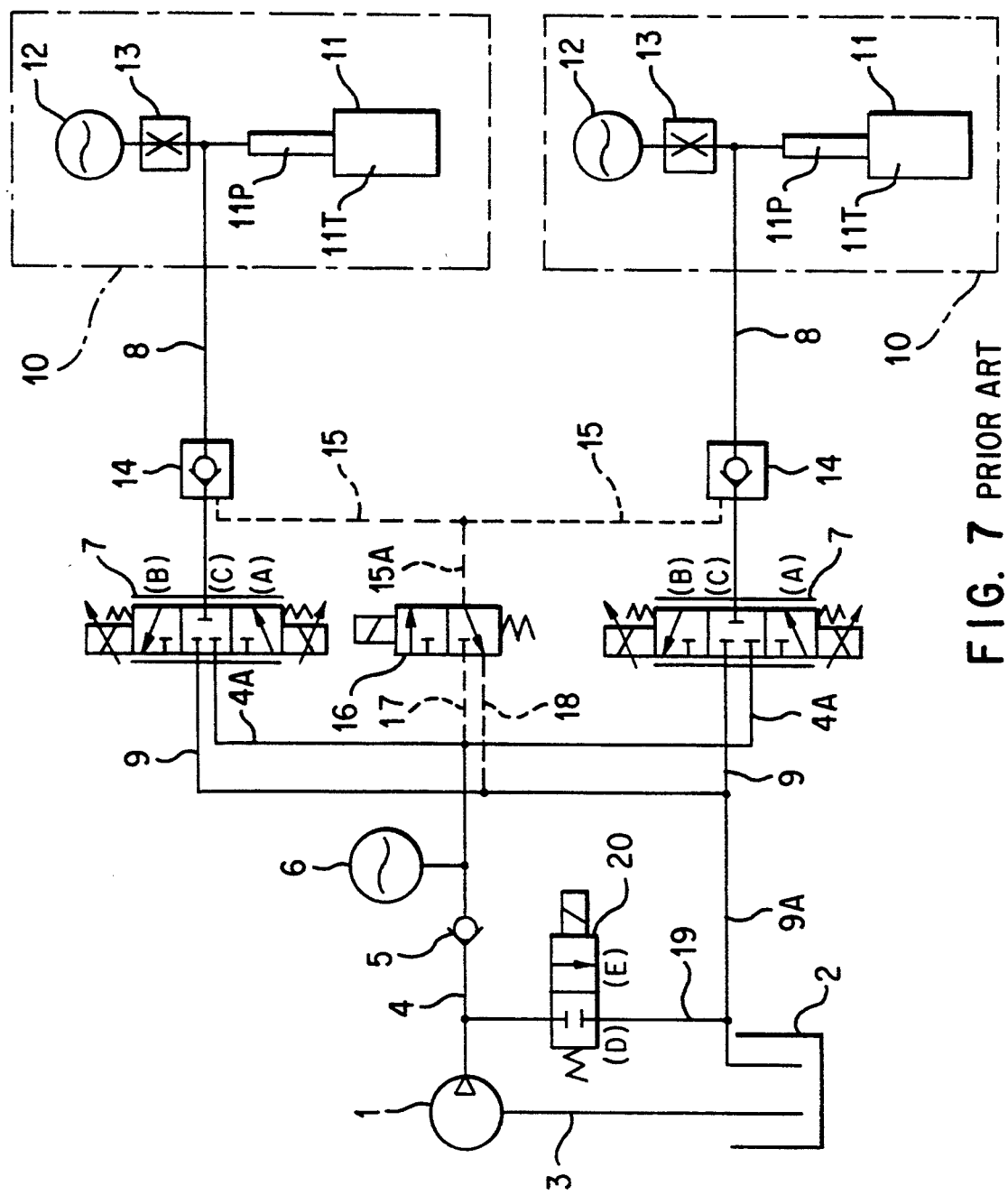
FIG. 7 is a schematic illustration of a prior art hydraulic suspension system.

A hydraulically adjustable suspension system having built-in valves, constructed in this way, is operated by the same suspension control hydraulic (SCH) circuit as that shown in FIG. 7 and in the same manner.

For causing the piston rod 28 to protrude for vehicle level and attitude control, when a current is supplied to the solenoid 44 of the feed oil valve 43F and energizes it to force or displace the secondary spool 44A in a direction shown by an arrow E (see FIG. 3), the secondary spool 44A communicates the oil inlet passage 45A and the oil outlet passage 45C of the guide ring 45 so as to allow oil at a pilot pressure in the oil feed passage 38F to act on the primary spool 46. This causes the primary spool 46 to move, in the direction E, against the return spring 49. The oil feed passage 38F, therefore, communicates with the feed-return oil passage 41 through the diametrical bleeder bores 46A and 46B via the pressure balancing valve 48. As a result, pressurized oil delivered from an oil pump 1 is introduced into the oil passage 32A of the manifold 32 by passing through, in order, the oil feed passage 38F, the feed-return oil passage 41 and the pilot pressure check valve 42. The pressurized oil introduced into the oil passage 32A of the manifold 32 is fed into the upper oil reservoir chamber C of the accumulator 33 through the oil passage 32B of the manifold 32 as well as into the lower pressure oil chamber B of the pressure tube 22 through the axial oil passage 31 of the piston rod 28, as shown in FIG. 1. Consequently, the piston rod 28 is forced upward and from the cylinder 11A. Adjusting the current supplied to the solenoids 44 increasingly and decreasingly varies the displacement of the secondary spool 44A, so as to vary the pressure of the pilot pressure oil acting on the primary spool 46 in response to changes in displacement of the secondary spool 44A. This causes changes in displacement of the primary spool 46 in response to changes in pressure of the pilot pressure oil. As a result, the pressurized oil, flowing through the diametrical bleeder bore 46B of the primary spool 46, is quantitatively controlled according to displacement changes of the primary spool 46 and fed into the lower pressure oil chamber B of the pressure tube 22 and the upper oil reservoir chamber C of the accumulator 33.

The pressure balancing valve 48 in the primary spool slides in opposite directions so as to variably open and close the diametrical bleeder bore 46A. The difference between the pressure acting on the pressure balancing valve 48 and that due to the balancing spring 48A is thereby balanced.

To retract the piston rod 28 for vehicle level and attitude control, a solenoid current is supplied to the solenoid 44 of the return oil valve 43R to energize the solenoid 44 and force or displace the secondary solenoid 44A in a direction indicated by an arrow F (see FIG. 3). The secondary spool 44A communicates the oil inlet passage 45A and the oil outlet passage 45C of the guide ring 45 so as to allow a pilot pressure oil in the feed oil passage 38F to act on the primary spool 46 through the pilot oil passage 39R via the oil inlet passage 45A and the oil outlet passage 45C. This causes the primary spool 46 to move, in the direction, F against the return spring 49, so as to communicate the return oil passage 38R with the feed-return oil passage 41 through the diametrical bleeder bores 46A and 46B via the pressure balancing valve 48. As a result, pressurized oil in the lower oil pressure chamber B of the pressure tube 22 and the upper oil reservoir chamber C of the accumulator 33 is returned into the oil tank 2 through the oil outlet port 37R via, in order, the oil passage 32A of the manifold 32, the pilot pressure check valve 42, the feed-return oil passage 41 and the return oil passage 38R. Also, in retracting the piston rod 28, quantitatively adjusting the current supplied to the solenoids 44 increasingly and decreasingly varies the displacement of the secondary spool 44A, so as to vary the pressure of the pilot pressure oil acting on the primary spool 46 in response to changes in displacement of the secondary spool 44A. This causes changes in displacement of the primary spool 46 in response to changes in pressure of the pilot pressure oil. As a result, the pressurized oil, flowing through the diametrical bleeder bore 46B of the primary spool 46, is quantitatively controlled according to the displacement changes of the primary spool 46, so as to control retraction of the piston rod 28 in response to the quantitatively controlled pressurized oil.

In a hydraulically adjustable suspension system in which the pilot pressure check valve 42, the feed oil valve 43F and the return oil valve 43R are all incorporated in the valve casing 36, integrally formed with the manifold 32 to which the piston rod 28 of the suspension cylinder 11A is secured, an oil flow rate control means, such as the oil feed valve 43F and the oil return valve 43R, is arranged at a short distance from the lower oil pressure chamber B of the pressure tube 22 and the upper oil reservoir chamber C of the accumulator 33. In addition, the suspension cylinder structure does not need pipes such as feed-return oil pipe 8, which is essential in the prior art hydraulically adjustable suspension system shown in FIG. 7. Elimination of piping between the oil flow rate control means, such as the feed oil valve 43F and the return oil valve 43R, and both the lower oil pressure chamber B of the pressure tube 22 and the upper oil reservoir chamber C of the accumulator 33 considerably decreases the pressurized oil flow resistance. This increases the responsiveness of the hydraulic cylinder 11A, i.e., the hydraulically adjustable suspension system, for vehicle attitude control. Consequently, the safety and stability of a traveling vehicle are greatly improved. Furthermore, the oil feed valve 43F and the oil return valve 43R need no brackets or other mounting members. This saves space and provides for ready assembly.

Figure 4:
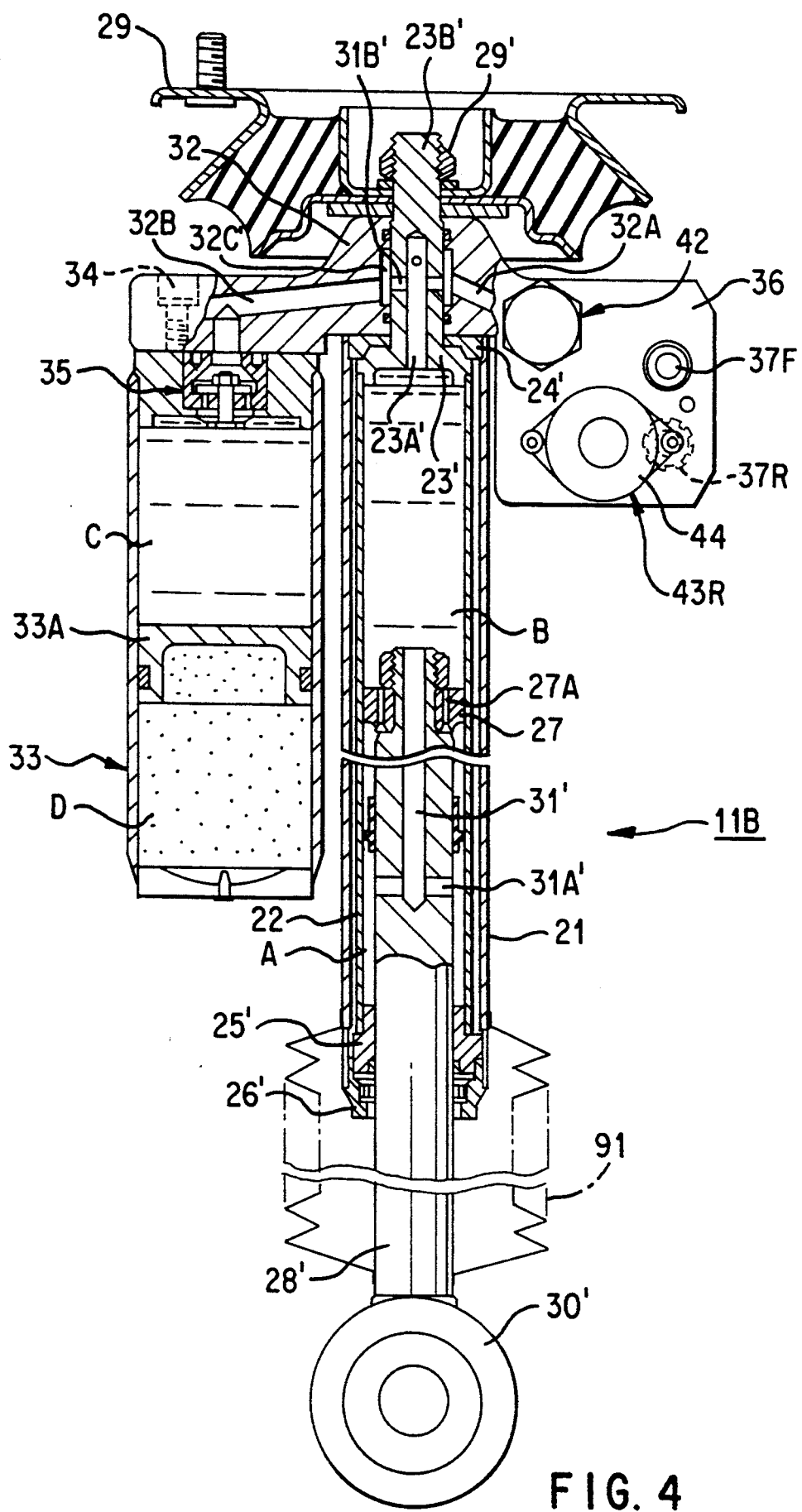
FIG. 4 is a cross-sectional view showing a variant of the hydraulic suspension system shown in FIG. 1.

Referring to FIG. 4, a variant of the hydraulically adjustable suspension system shown in FIGS. 1 to 3 is shown. This variant is almost the same in operation and effect as that of the previously described embodiment, except that a hydraulic cylinder is disposed upside down with respect to a manifold.

Generally sector-shaped manifold 32 is integrally formed with a valve casing 36 and disposed between a mount bracket assembly 29 and a hydraulic cylinder 11B. In more detail, the hydraulic cylinder 11B has an open ended, cylindrical outer tube 21 and an open ended, cylindrical inner pressure tube 22 disposed coaxially with and inside the outer tube 21. A top opening of the outer tube 21 is closed by an outer end cap 24'. A top opening of the pressure tube 22 is plugged and fluid-tightly closed by an inner end cap 23'. The inner end cap 23' is formed with an integral cap extension 23B', in the form of a rod, which extends and penetrates the outer end cap 24' and the manifold 32. In the lower half portion of the integral end cap extension 23B', there is formed an axial bore 23A', opening at its lower end into the upper oil chamber B. The axial bore 23A' communicates the upper oil chamber B with oil passages 32A and 32B of the manifold 32, through diametrical bleeder bore 31B' of the integral end cap extension 23B', via an inner circumferential groove 32C'.

Piston rod 28' extends downward and partly outside of the hydraulic cylinder 11B. The piston rod 28' is securely provided, at its lower end, with a mounting ring 30', through which the hydraulic cylinder 11B is fastened to a drive axle (not shown) of the vehicle in a well known manner. The pressure tube 22 is provided with an annular piston rod guide 25', which is fluid-tightly fitted in bottom openings of both the outer tube 21 and the pressure tube 22. An annular bottom plug 26 is fastened into the bottom opening of the outer tube 21. The annular piston rod guide 25 and the annular top plug 26 hold a piston rod 28' and allow it to fluid-tightly slide up and down in the pressure tube 22. The piston rod 28' is provided with a piston 27 fastened to its upper end. The piston 27 is fluid-tightly and snugly received in the pressure tube 22 and divides the interior space of the pressure tube 22 into two, namely, lower and upper, oil pressure chambers A and B. The piston 27 is formed with thin bleeder bores 27A so as to communicate the oil pressure chambers A and B with each other. The piston rod 28' is formed with a hollow center or axial oil passage 31' in its upper half portion. The passage 31' has an upper end opening into the upper oil pressure chamber B and a closed lower end. Near the closed lower end of the axial oil passage 31', the piston rod 28' is formed with a diametrical bleeder bore 31A', opening at opposite ends into the lower oil pressure chamber A, through which the upper and lower oil pressure chambers B and A are communicated with each other. The hydraulic cylinder 11B, thus structured, is fastened to the mount bracket assembly 29 with a screw 29' fitted to the integral end cap extension 23B' with the manifold 32 firmly grasped therebetween. The lower portion of the piston rod 28', extending outside the outer tube 21, is protected by a flexible dust boot 91.

Figure 5:
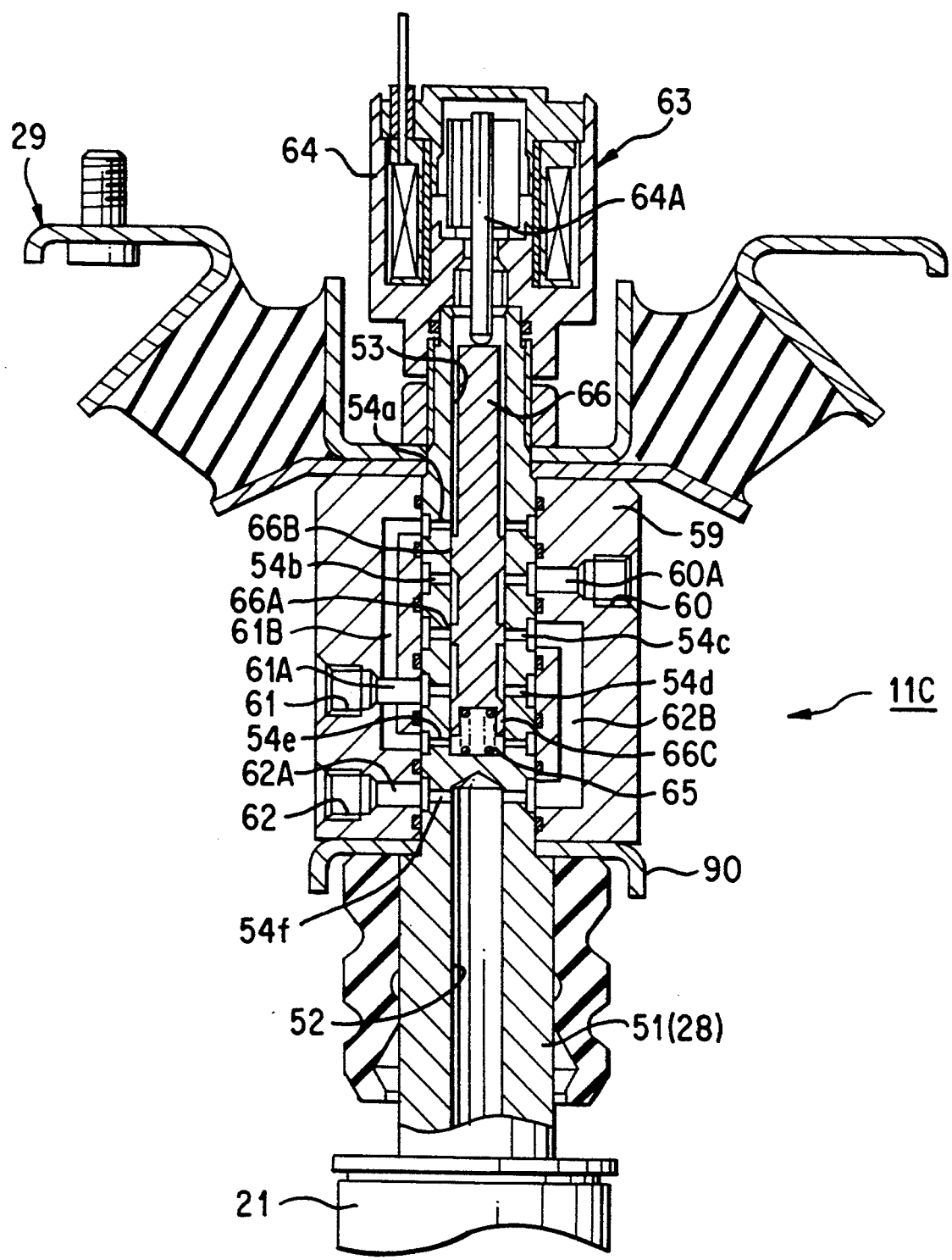
FIG. 5 is a cross-sectional view of a hydraulic suspension system in accordance with another preferred embodiment of the present invention.

FIG. 5 illustrates a hydraulically adjustable suspension system for an automobile in accordance with another preferred embodiment of the present invention. In this embodiment, a fluid control valve is built in a piston rod. Except for a piston rod and fluid control valves, all elements are the same in structure and operation as those of the previously described hydraulically adjustable suspension systems. Consequently, the following description will be directed only to the piston rod with built-in fluid control valves and its associated elements.

Piston rod 28 is almost the same as the piston rod shown FIG. 1. The piston rod 28 has an upper piston rod extension 51 forming part of a flow rate control means including a fluid control valve. In the upper piston rod extension 51, there is formed an upper axial oil passage extension 52, extending from an axial oil passage (not appearing in FIG. 5). The upper piston rod extension 51 is further formed with a cylindrical spool guide bore 53, axially above the axial oil passage extension 52, in which a spool 66 slides axially up and down. A manifold 59, which is mounted on the upper piston rod extension 51 between a mount bracket assembly 29 and a dust tube 90, is formed with various ports and passages, such as an inlet port 60, an outlet port 61, a feed oil passage 60A, return oil passages 61A and 61B and a feed-return oil passage 62B. The spool guide bore 53 of the upper piston rod extension 51 is selectively communicated with ports 60 and 61 and passages 60A, 61A, 61B and 62B by the spool 66 through diametrical bleeder bores 54a to 54e formed in the upper piston rod extension 51. The manifold 59 is further formed with a feed-return port 62 and a feed-return oil passage 62A. The feed-return oil passages 62A and 62B are communicated with the axial oil passage extension 52 of the upper piston rod extension 51 through a diametrical bleeder bore 54f formed in the upper piston rod extension 51. Specifically, the inlet port 60 and the outlet port 61 are, respectively, communicated with an oil pump 1 and an oil tank 2. The feed-return port 62 is communicated with an accumulator 33 through a pressure reducing valve 33 (see FIG. 1). The oil return passage 61B is communicated with the spool guide bore 53 of the upper piston rod extension 51 through the diametrical bleeder bores 54a and 54e of the upper piston rod extension 51. The oil return passage 62B communicates the spool guide bore 53 and the axial oil passage extension 52 of the upper piston rod extension 51 through the diametrical bleeder bores 54c and 54f of the upper piston rod extension 51.

Flow rate control means, such as a proportional type, solenoid operated hydraulic fluid control valve 63, is fastened to the top of the upper piston rod extension 51 above the mount bracket assembly 29 through which the hydraulic cylinder 11C is secured to a vehicle body (not shown) in a well known manner. The fluid control valve 63 includes solenoid 64 for electromagnetically forcing a plunger 64A up and down, a spool 66 disposed in the spool guide bore 53 of the upper piston rod extension 51, and a return spring 65 disposed between the bottom of the spool guide bore 53 of the upper piston rod extension 51 and the spool 66 so as to urge the spool 66 upward. The spool 66 is formed with an annular peripheral center land 66A, and upper and lower annular peripheral lands 66B and 66C which are axially separated up and down with respect to the center land 66A.

When the solenoid 64 is not energized, the center land 66A closes the diametrical bleeder bore 54c of the upper piston rod extension 51. When the solenoid 64 is energized to cause the plunger 64A to protrude downwardly, it thrusts the spool 66 downward against force of the return spring 65. The diametrical bleeder bores 54b and 54c of the upper piston rod extension 51 are then communicated with each other. As a result, pressurized oil delivered from the oil pump 1 is introduced into the oil pressure chamber B of the hydraulic cylinder 11C through the oil feed passage 60A, the feed-return oil passage 62B and the axial oil passage 31, including the axial oil passage extension 52. The pressurized oil then passes into the upper oil reservoir chamber C of the accumulator 33 through the oil feed passage 60A, the feed-return oil passage 62B and the feed-return oil passage 62A, in this order.

On the other hand, when the solenoid 64 is energized to retract the plunger 64A upward so as to allow the spool 66 to be thrust upward by the return spring 65, the diametrical bleeder bores 54c and 54d of the upper piston rod extension 51 are communicated with each other. As a result, the pressurized oil in the pressure oil chamber B of the hydraulic cylinder 11C is returned into the oil tank 2 through the axial oil passage 31 including the axial oil passage extension 52, the feed-return oil passage 62B and the oil return passage 61A, in this order. Similarly, the pressurized oil in the upper oil reservoir chamber C of the accumulator 33 is returned into the oil tank 2 through the feed-return oil passages 62A, the feed-return oil passage 62B and the oil return passage 61A, in this order.

The rate at which pressurized oil is introduced into and returned from the hydraulic cylinder 11C is controlled according to the opening of the diametrical bleeder bore 54c, which is proportional to displacement of the spool 66. Therefore, the pressurized oil fed to and returned from the oil pressure chamber B of the hydraulic cylinder 11C and the upper oil reservoir chamber C of the accumulator 33 is quantitatively controlled according to solenoid current intensity applied to the solenoid 64 of the fluid control valve 63. In other words, the level of the vehicle can be increasingly and decreasingly controlled in response to solenoid current intensity applied to the solenoid 64 of the fluid control valve 63.

In addition to the effects detailed by the previously described hydraulically adjustable suspension system, a hydraulically adjustable suspension system in which the fluid control valve 63 is built in the piston rod 28 provides an improved hydraulic cylinder and, therefore, an improved automobile suspension responsiveness. A decreased assembly space is also permitted.

Figure 6:
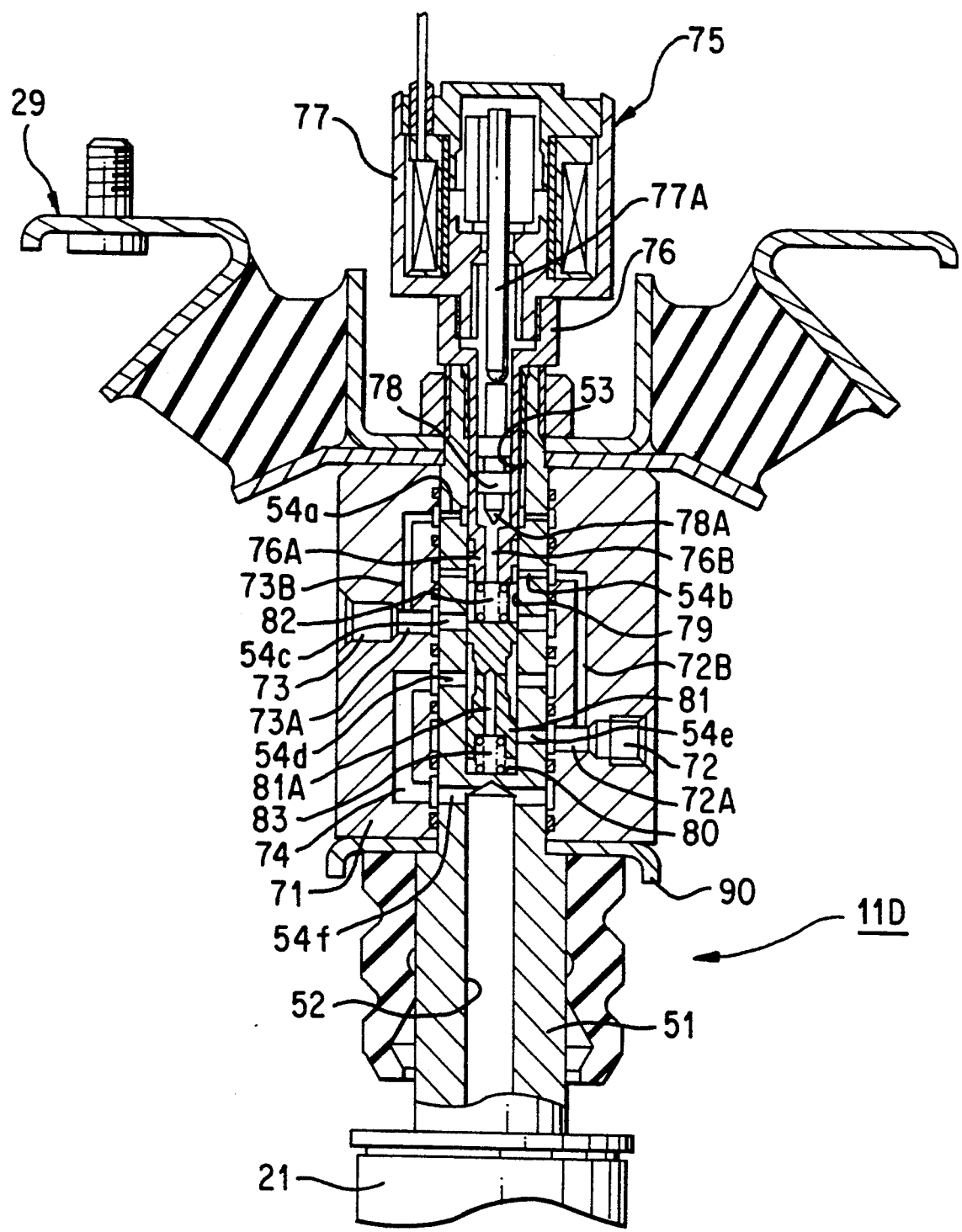
FIG. 6 is a cross-sectional view showing a variant of the hydraulic suspension system shown in FIG. 5.

Referring to FIG. 6 a hydraulically adjustable suspension system for an automobile in accordance with another preferred embodiment of the present invention is shown. In this embodiment, a pressure control feature is added to the hydraulically adjustable suspension system shown in FIG. 5.

Piston rod 28 has an upper piston rod extension 51 forming part of a flow rate control means including a fluid control valve and is the same as the piston rod shown FIG. 1. The upper piston rod extension 51 is formed with a cylindrical spool guide bore 53, axially above an axial oil passage extension 52, in which a spool 66 slides axially up and down. A manifold 71 is mounted on the upper piston rod extension 51 between a mount bracket assembly 29 and a dust tube 90. The manifold is formed with an inlet port 72 in communication with an oil pump 1 and an outlet port 73 in communication with an oil tank 2. The manifold 71 is further formed with various passages, such as an oil feed passage 72A, oil return passages 73A and 73B, a pilot pressure oil passage 72B and a feed-return oil passage 74. The spool guide bore 53 of the upper piston rod extension 51 is selectively communicated with passages 72B, 73A, 73B and 74 by the spool 66 through diametrical bleeder bores 54a to 54e formed in the upper piston rod extension 51. The feed-return oil passage 74 communicates the spool guide bore 53 with an accumulator 33 and an oil pressure chamber B of a hydraulic cylinder 11D through the diametrical bleeder bores 54d and 54f of the upper piston rod extension 51.

Pressure control means, such as a proportional type, solenoid operated pressure control valve 75, has a stepped, cylindrical valve body 76 formed with an axial bore 76B. The valve body 76 is threadingly fitted, or otherwise secured, into the top of the upper piston rod extension 51 above a mount bracket assembly 29 through which the hydraulic cylinder 11D is secured to a vehicle body (not shown) in a well known manner. In the cylindrical valve body 76, the pressure control valve 75 includes a solenoid 77, fitted in an upper stepped portion of the valve body 76, for electromagnetically forcing a plunger 77A up and down, a pilot spool 78 and a primary spool 81. The pilot spool 78 is formed with a cone-shaped valve head 78A, and is disposed between the plunger 77A and the lower stepped portion 76A of the cylindrical valve body 76 so as to slide in the axial bore 76B. With axial displacement of the plunger 77A, the axial position of the pilot spool 78 changes so as to variably open and close the axial bore 76B with its cone-shaped valve head 78A. The primary spool 81 is formed with an oil passage 81A in its lower half portion. In the spool guide bore 53 of the upper piston rod extension 51, two upper pressure oil chambers are formed. These chambers include an upper oil pressure chamber 82, between the primary spool 81 and the lower stepped portion 76A of the cylindrical valve body 76, and a lower oil pressure chamber 83, between the primary spool 81 and the bottom of the spool guide bore 53 of the upper piston rod extension 51. The primary spool 81 is placed between top and bottom balancing springs 79 and 80, disposed in the upper and lower oil pressure chambers 82 and 83, respectively, in the spool guide bore 53 of the upper piston rod extension 51.

With changes in solenoid current intensity applied to the solenoid 77 of the pressure control valve 75, the plunger 77A moves up and down. The pilot spool is forced up and down accordingly, and the opening of the axial bore 76B of the lower stepped portion 76A of the cylindrical valve body 76 is increasingly and decreasingly changed by the cone-shaped valve head 78A of the pilot spool 78. As the opening of the axial bore 76B of the lower stepped portion 76A of the cylindrical valve body 76 is made smaller, the pilot pressure in the upper oil pressure chamber 82 increases so as to displace the primary spool 81 downward. When the pilot pressure in the upper oil pressure chamber 82 increases, the primary spool 81 is placed so as to communicate the diametrical bleeder bores 54d and 54e of the upper piston rod extension 51 with each other, thereby allowing the oil pressure to be fed to the oil pressure chamber B of the hydraulic cylinder 11D through the inlet port 72 and the feed-return oil passage 74. When the pilot pressure in the upper pressure oil chamber 82 drops, however, the primary spool 81 is placed so that the diametrical bleeder bores 54c and 54d of the upper piston rod extension 51 communicate with each other, thereby allowing the oil pressure in the oil pressure chamber B of the hydraulic cylinder 11D to be returned to the oil tank 2 through the feed-return oil passage 74 and the outlet port 73.

In the oil pressure chamber 82, pressurized oil is introduced into and returned from the hydraulic cylinder 11D at a pilot pressure. A change in pilot pressure in the oil pressure chamber 82 is controlled according to the opening of the axial bore 76B of the lower stepped portion 76A of the cylindrical valve body 76. This change is proportional to displacement of the pilot spool 78. The pressurized oil introduced into and returned from the pressure oil chamber B of the hydraulic cylinder 11D and the reservoir oil chamber C of the accumulator 33 is quantitatively controlled in the same manner as in the hydraulically adjustable suspension system shown in FIG. 5, i.e., according to solenoid current intensity applied to the solenoid 77 of the pressure control valve 75.

The hydraulically adjustable suspension system of this embodiment allows the body of the vehicle to be free from jarring forces, even when the vehicle travels on a rough road. This provides riding comfort, and results from the provision of the oil passage 81A. As shown, the oil passage 81A is formed in the lower half portion of the primary spool 81, which is always in communication with the oil pressure chamber B of the hydraulic cylinder 11D through the feed-return oil passage 74 of the manifold 71 and the axial oil passage extension 52, extending from an axial oil passage 31 of the upper piston rod extension 51, via the diametrical bleeder bore 54d of the upper piston rod extension 51. Even when there is a rise in oil pressure in the oil pressure chamber B of the hydraulic cylinder 11D, due to oscillatory displacement of the piston rod 28, which is caused by rapid up-and-down motion of wheels from rough road spots, the oil pressure in the oil pressure chamber 83 between the primary spool 81 and the bottom of the spool guide bore 53 of the upper piston rod extension 51 rises in response to the oil pressure rise in the oil pressure chamber B. The primary spool 81 is displaced upward, therefore, and communicates the oil pressure chamber B of the hydraulic cylinder 11D with the oil tank 2 via the diametrical bleeder bores 54c and 54d. This allows the oil in the oil pressure chamber B of the hydraulic cylinder 11D to be returned into the oil tank 2.

In the hydraulically adjustable suspension systems described above, in which the control valve is built in the piston rod as shown in FIGS. 5 and 6, it is preferred to dispose the damping force generating mechanism and the accumulator at a lower end portion of the outer tube 21 so as to communicate with the oil pressure chamber B of the pressure tube 22 of the hydraulic cylinder 11C or 11D.

It is to be understood that although the present invention has been described in detail with respect to preferred embodiments thereof, various other embodiments and variants may occur to those skilled in the art. Any such other embodiments and variants which fall in the scope and spirit of the invention are intended to be covered by the following claims.

What is claimed is:

1. A hydraulic suspension device for an automobile for vehicle level control, said device receiving pressurized fluid from and releasing pressurized fluid into a hydraulic control circuit, including a hydraulic oil pump and an oil tank, and comprising:

a hydraulic cylinder assembly having a hollow pressure tube, a piston which is slidably received in said hollow pressure tube so as to form a pressure fluid chamber within said hollow pressure tube, and a piston rod secured at one end to said piston and extending so that its other end is disposed outside of said hollow pressure tube;

fluid passage means, incorporated in one of said piston rod and said hollow pressure tube, for communicating said pressure fluid chamber with said hydraulic control circuit; and valve means for regulating a position of the automobile to provide said vehicle level control by controlling pressurized fluid introduced into said pressure fluid chamber through said fluid passage means, said valve means being (a) disposed between (1) the hydraulic cylinder assembly and (2) the hydraulic oil pump and the oil tank so as to selectively communicate the hydraulic cylinder assembly with the hydraulic oil pump and the oil tank to introduce said pressurized fluid into and release said pressurized fluid from said hydraulic cylinder assembly and (b) directly and integrally attached to said one of said piston rod and said hollow pressure tube outside of said hollow pressure tube.

2. A hydraulic suspension device as defined in claim 1, wherein said valve means comprises a solenoid operated proportional valve.

3. A hydraulic suspension device as defined in claim 2, wherein said valve means comprises a pressure control valve for controlling a pressure of said pressurized fluid.

4. A hydraulic suspension device as defined in claim 2, wherein said valve means comprises a flow control valve for controlling a rate of flow of said pressurized fluid.

5. A hydraulic suspension device as defined in claim 1, and further comprising at least one accumulator and a damping force generating mechanism through which said accumulator communicates with said fluid passage means..

6. A hydraulic suspension device as defined in claim 5, and further comprising a manifold attached to said one of said piston rod and said hollow pressure tube and formed with fluid passages, forming at least part of said fluid passage means, extending on diametrically opposite sides with respect to said hydraulic cylinder assembly, said manifold being attached with said valve means and said accumulator so as to communicate said valve means and said accumulator to said fluid passage means through said fluid passages.

7. A hydraulic suspension device as defined in claim 6, wherein said valve means comprises a feed fluid control valve through which said pressurized fluid is introduced into said pressure fluid chamber and a return fluid control valve through which said pressurized fluid is released from said pressure fluid chamber, said feed fluid control valve and said return fluid control valve being incorporated in said manifold at a separation from each other in a lengthwise direction of said hydraulic cylinder assembly.

8. A hydraulic suspension device as defined in claim 7, wherein said feed fluid control valve and said return fluid control valve communicate in parallel with said pressure fluid chamber.

9. A hydraulic suspension device as defined in claim 6, and further comprising a check valve disposed between said fluid passage means and said valve means.

10. A hydraulic suspension device for an automobile for vehicle level control, said device receiving pressurized fluid from and releasing pressurized fluid into a hydraulic control circuit., including a hydraulic oil pump and an oil tank, and comprising:

a hydraulic cylinder assembly having a hollow pressure tube, a piston which is slidably received in said hollow pressure tube so as to form a pressure fluid chamber within said hollow pressure tube, and a piston rod secured at one end to said piston and extending so that its other end is disposed outside of said hollow pressure tube;

a fluid passage formed lengthwise in said piston rod for communicating said pressure fluid chamber with said hydraulic control circuit; and valve means for regulating a position of the automobile to provide said vehicle level control by controlling pressurized fluid introduced into said pressure fluid chamber passing through said fluid passage, said valve means being (a) disposed between (1) the hydraulic cylinder assembly and (2) the hydraulic oil pump and the oil tank so as to selectively communicate the hydraulic cylinder assembly with the hydraulic oil pump and the oil tank to introduce said pressurized fluid into and release said pressurized fluid from said hydraulic cylinder assembly and (b) directly and integrally attached to a portion of said piston rod outside of said hollow pressure tube.

11. A hydraulic suspension device as defined in claim 10, wherein said valve means comprises a solenoid operated proportional valve.

12. A hydraulic suspension device as defined in claim 11, and further comprising a mount bracket through which said hydraulic cylinder assembly is mounted to a vehicle body at said portion of said piston rod, said valve means being mounted on said portion of said piston rod between said mount bracket and said hollow pressure tube.

13. A hydraulic suspension device as defined in claim 12, wherein said valve means includes a spool, slidably movable lengthwise of said piston rod, and solenoid means, disposed above said mount bracket, for forcing said spool up and down.

* * * * *